United States Patent [19]
Meyer et al.

[11] 3,835,678
[45] Sept. 17, 1974

[54] VEHICLE BODY COMPARTMENT PANEL PULL-DOWN MECHANISM

[75] Inventors: Barthold F. Meyer, Bloomfield Hills; Floyd I. Dully, Detroit; Bela Gergoe, Birmingham; Bohdan Kazewych, Union Lake; Robert M. Hebert, Birmingham, all of Mich.

[73] Assignee: General Motors Corporation, Detroit, Mich.

[22] Filed: Aug. 29, 1973

[21] Appl. No.: 392,535

[52] U.S. Cl. ............... 70/241, 70/279, 292/341.16
[51] Int. Cl... E05b 65/19, E05b 47/00, E05b 15/02
[58] Field of Search..................... 70/241, 277, 279; 292/341.16, DIG. 43

[56] References Cited
UNITED STATES PATENTS

| | | | |
|---|---|---|---|
| 2,896,990 | 7/1959 | Garvey et al. | 292/229 |
| 2,903,288 | 9/1959 | Joachim et al. | 292/341.16 |
| 2,916,319 | 12/1959 | DuBois | 292/341.16 |
| 2,994,550 | 8/1961 | White | 292/341.16 |
| 3,056,619 | 10/1962 | Fox et al. | 292/341.15 |
| 3,403,934 | 10/1968 | Butts | 292/341.16 |

*Primary Examiner*—Albert G. Craig, Jr.
*Attorney, Agent, or Firm*—J. A. Kushman

[57] ABSTRACT

A pull-down mechanism for a vehicle body compartment panel includes a housing mounted on the vehicle body and supporting a bolt keeper that is driven in a sequenced manner between retracted and extended positions by a linkage connected to the output of a reduction gear drive train whose input is driven by a unidirectional electric motor. The sequencing of the keeper is provided by the cooperable action of a depressible plunger responsive to latching of a panel mounted bolt assembly to the extended keeper and to key unlatching of the bolt assembly from the retracted keeper so as to actuate a switch control member that initiates driving movement of the keeper to the other position, and by a cam rotatable with the output of the gear drive train to maintain the control member actuated until the keeper reaches the other position. The linkage includes a first link rotatable with the output of the gear drive train and having stop and undetenting surfaces. A combined stop and undetenting lever on the housing is engaged by the stop surface of the link to limit reverse movement of the drive train when the keeper reaches retracted position and closes the panel, and is engaged by the undetenting surface of the link to actuate a bolt undetenting member that unlatches the bolt assembly from the keeper when the keeper is driven to extended position by actuation of a vehicle occupant compartment switch. A lost motion connection drives the cam with the output of the drive train and prevents a slight reverse movement of the drive train before the stop action of the link and lever occurs from reactuating the switch control member. An electrical grounding of a contact on the plunger to either the bolt assembly or the keeper allows normal operation of the pull-down mechanism but prevents initiation of the retracting movement of the keeper by manual depression of the plunger. A spring biased pin and slot connection of the linkage provides automatic adjustment of the keeper adjacent its retracted position so that full cycling of the mechanism is possible even if the panel cannot move all the way to closed position.

5 Claims, 12 Drawing Figures

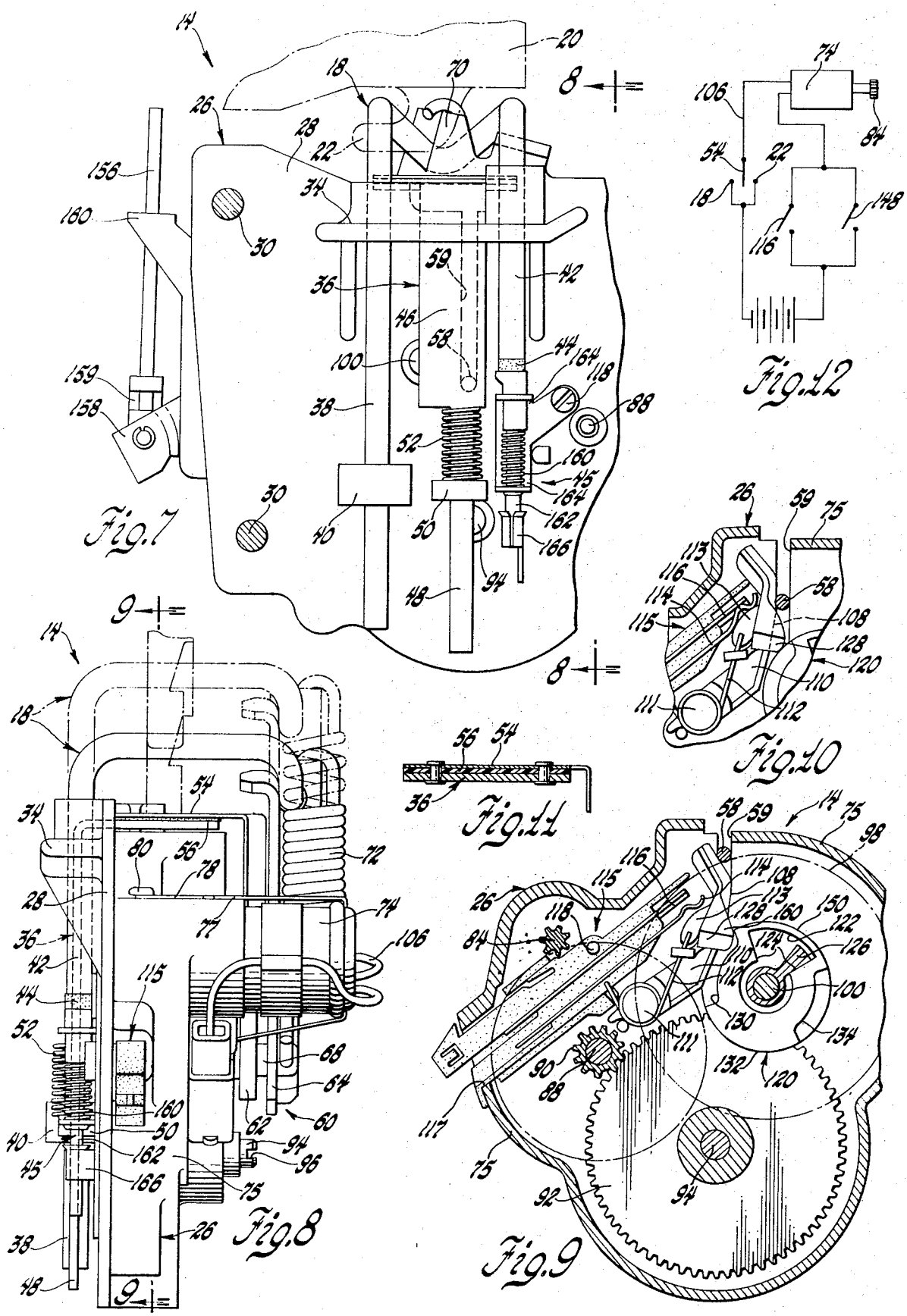

VEHICLE BODY COMPARTMENT PANEL PULL-DOWN MECHANISM

BACKGROUND OF THE INVENTION

This invention relates generally to a pull-down mechanism for a vehicle body compartment panel.

It is of course well known for a vehicle body to include a compartment panel movable between open and closed positions with respect to an access opening of the associated compartment. It is also known to provide a rubber seal or the like extending between the edge of the panel and the edge of the opening while the panel is in closed position so as to seal the compartment from the environment. Manual effort is generally utilized to provide the compressive sealing forces of this seal as the panel is moved to closed position.

In order to eliminate the necessity of this manual effort to compress the seal, it is also known to provide a pull-down mechanism for the compartment panel. U.S. Pat. Nos. 3,378,291 Brian and 3,403,934 Butts, both assigned to the assignee of the present invention, disclose such pull-down mechanisms. These mechanisms provide a latching between the panel and a movable keeper positioned in an extended position as the panel is moved to a partially closed position, and thereupon provide an actuation that moves the keeper to a retracted position to pull the panel to its fully closed position to thereby apply the seal compression. This action eliminates the necessity of applying manual effort to compress the seal between the panel and the vehicle body.

SUMMARY OF THE INVENTION

This invention provides a vehicle body compartment panel pull-down mechanism in which a vehicle body mounted keeper is driven by a reduction gear drive train in a sequenced manner so as to move between an extended position where a bolt assembly on the panel latches to the keeper and positions the panel in a partially closed position and a retracted position where the keeper positions the panel in its fully closed position. The sequencing is provided by the cooperable action of a depressible plunger responsive to latching of the bolt assembly to the extended keeper and key unlatching of the bolt assembly from the retracted keeper so as to initially actuate a switch control member of an electric motor energizing circuit and to thereby begin this driving movement of the keeper to the other position, and by a cam rotatable with the output of the drive train so as to maintain the switch control member actuated until the keeper reaches either the retracted or extended position. A linkage extends between the output of the gear drive train and the keeper to drive the keeper and includes a first link having a stop surface and an undetenting surface. A lever pivoted to the housing is engaged by the stop surface of the link to limit reverse movement of the drive train when the keeper is in retracted position, and is engaged by the undetenting surface of the link to move an undetenting member into engagement with the bolt assembly so as to unlatch the bolt while the keeper is driven to extended position upon manual actuation of a vehicle occupant compartment switch. A lost motion connection drives the cam with the output of the drive train and prevents a slight reverse movement of the drive train before the stop action of the link and lever occurs from causing the cam to reactuate the switch control member. Thus, when the panel is closed on a compressible piece of luggage that tends to reverse the drive train movement and move the panel in an opening direction after de-energization of the motor, this lost motion connection prevents the motor from being cyclically reactuated to drive the panel in a closing direction where the motor is cyclically de-energized. Electrical grounding of a contact carried by the plunger to either the bolt assembly or the keeper allows normal operation of the pull-down mechanism but prevents actuation of the motor upon manual depression of the plunger. A spring biased pin and slot connection of the linkage provides automatic adjustment of the keeper while moving adjacent retracted position so that the mechanism can operate through its full cycle even when the keeper is prevented from moving to the fully retracted position.

BRIEF DESCRIPTION OF THE DRAWINGS

The objects, features and advantages of the present vehicle body compartment panel pull-down mechanism are readily apparent from the following detailed description of the preferred embodiment and the drawings in which:

FIG. 7 is an elevation view of the pull-down mechanism looking forwardly with respect to the vehicle body along line 7—7 of FIG. 2;

FIG. 8 is a side elevation view of the pull-down mechanism taken generally along line 8—8 of FIG. 7;

FIG. 9 is a sectional view of the pull-down mechanism taken along line 9—9 of FIG. 8 and shows a switch control member in an unactuated position;

FIG. 10 is a view of a portion of FIG. 9 which shows the switch control member moved to an actuated position by a plunger of the mechanism in order to energize driving movement of the bolt keeper of the mechanism;

FIG. 11 is a sectional view of the upper end of the plunger taken along line 11—11 of FIG. 2 and shows a grounding contact that engages the bolt assembly or keeper to normally ground the energization circuit of the mechanism but which prevents actuation of the mechanism upon manual depression of the plunger; and FIG. 12 is a schematic view which shows the circuit for energizing the electric motor which drives the pull-down mechanism.

DETAILED DESCRIPTION OF THE PREFERRED EMBODIMENT

Figure 1:
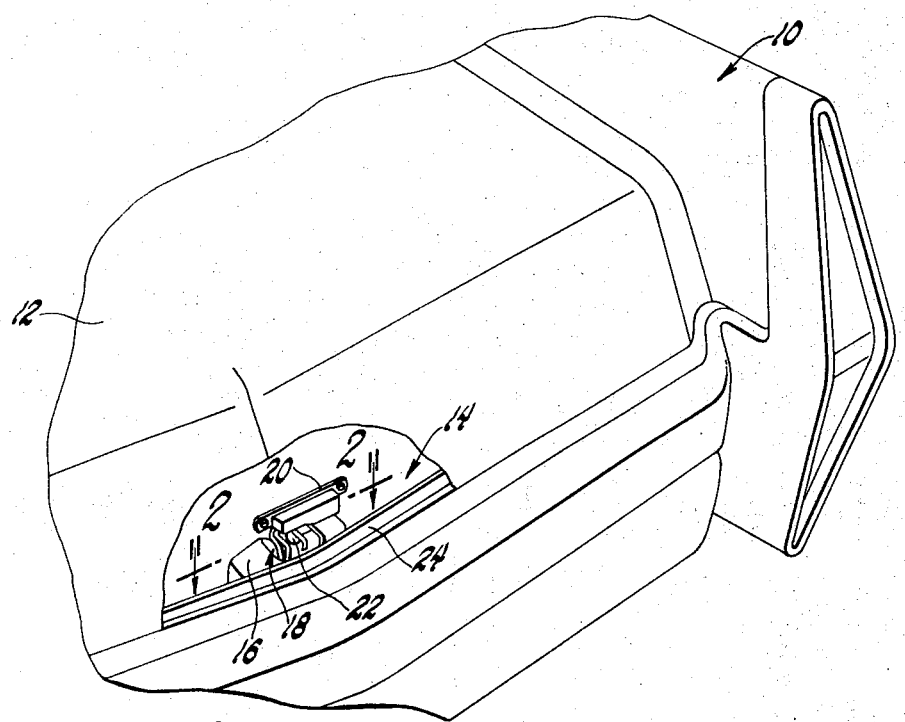
FIG. 1 is a partially broken away perspective view of the rear end of a vehicle body whose rear luggage compartment panel is movable to and from its closed position by a pull-down mechanism according to this invention.

Referring to FIG. 1 of the drawings, a vehicle body generally indicated by 10 includes a rear luggage compartment panel 12 whose forward end, not shown, is swingably mounted to the body and whose rearward end is associated with a pull-down mechanism 14 according to this invention. This mechanism includes a sheet metal trim cover 16 supported on the vehicle body and a metallic keeper 18 that is driven between upper and lower retracted and extended positions. The pull-down mechanism also includes a bolt assembly 20 mounted on the compartment panel 12 and having a bolt 22 for latching the compartment panel to the keeper 18. This bolt assembly is of the well known type wherein the bolt is spring biased to an unlatched position and moved to a latched position by engagement of the bolt with the keeper during closing of the compartment panel. A detent, not shown, of the bolt assembly 20 automatically maintains the bolt in latching engagement with the keeper upon bolt movement to the latched position. The bolt assembly may be undetented in a conventional manner by key action of a lock cylinder, not shown, or may be undetented by actuation of an occupant compartment switch that drives the panel 12 toward open position and concomitantly moves an undetenting member into engagement with the bolt assembly in a manner that will be more fully hereinafter described. A seal 24, shown at the broken away rear portion of panel 12, extends around the compartment opening closed by panel 12 and is subjected to compressive sealing forces by pull-down mechanism 14 as the mechanism moves the panel to the fully closed position as will be described.

Figure 2:
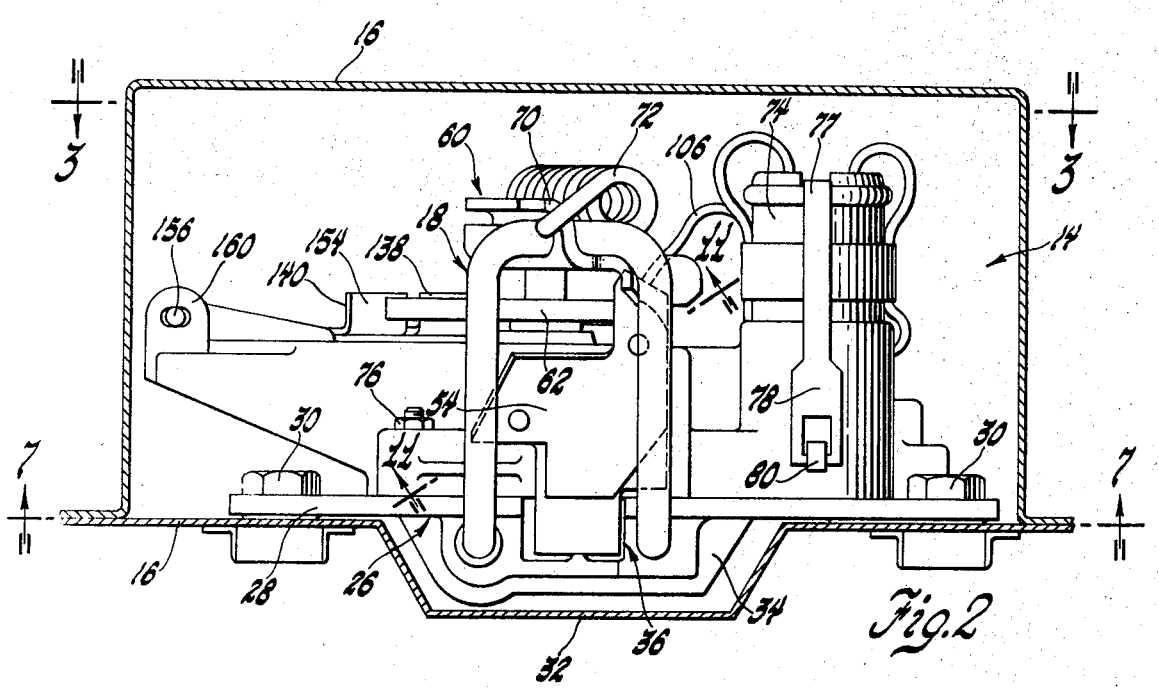
FIG. 2 is a plan view of the pull-down mechanism taken generally along line 2—2 of FIG. 1.
Figure 3:
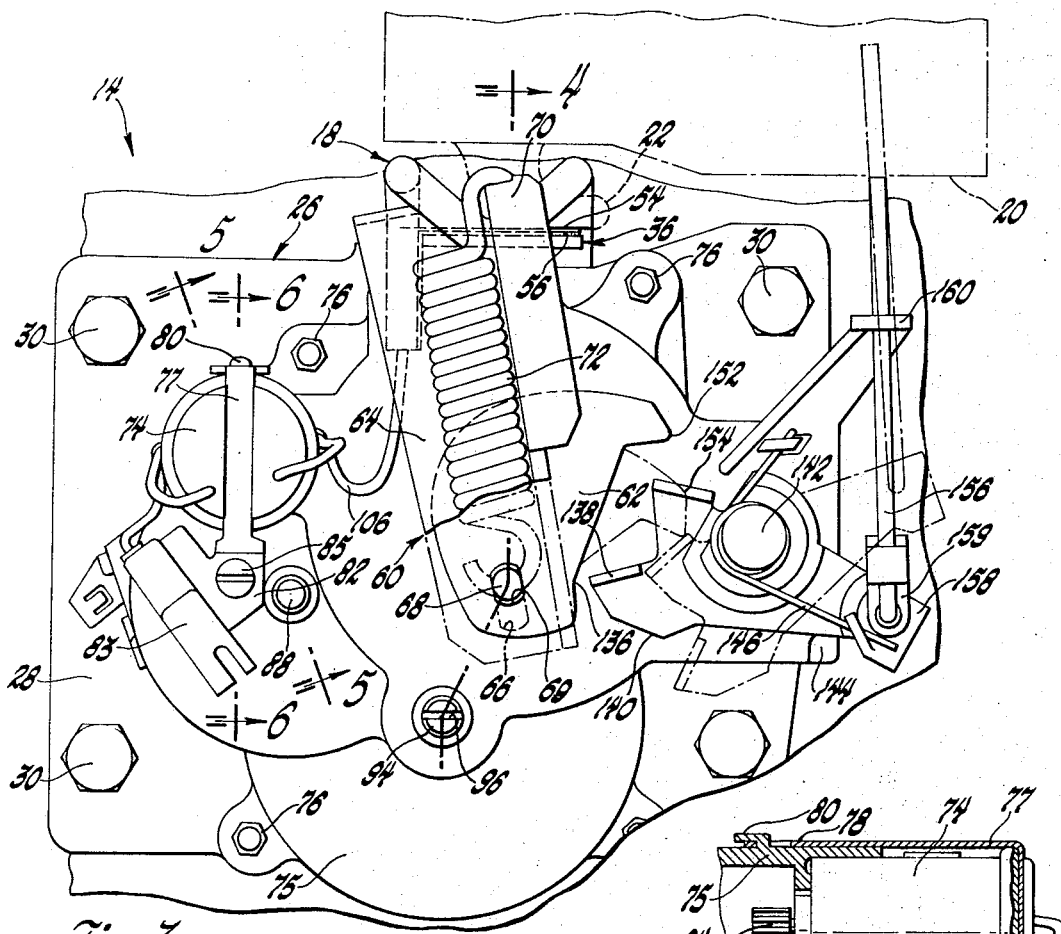
FIG. 3 is a rearwardly looking elevation view of the pull-down mechanism taken along line 3—3 of FIG. 2.

Referring additionally now to FIG. 2, one can see that the sheet metal trim cover 16 encloses a housing 26 including a mounting plate 28 with a planar generally rectangular configuration, see also FIG. 3. The corners of mounting plate 28 receive bolts 30 so as to mount this housing on the vehicle body. The rear side of trim cover 16, see FIG. 2, is stamped to form a depression 32 that extends vertically. This depression receives a rearwardly extending U-shaped embossed ear 34 that is integral with mounting plate 28 of housing 26. The keeper 18 has an upper U-shaped portion, as seen in FIG. 2, that is located above the upper end of a plunger indicated by 36. The upper portion of the keeper extends rearwardly to above embossed ear 34. As seen by additionally referring to FIG. 7, the keeper 18 has a left-hand leg 38 that extends downwardly through a slide aperture in the left-hand embossment of ear 34 and from there extends downwardly through a slide aperture in a lower ear 40 integral with mounting plate 28. The keeper 18 also has a somewhat shorter right-hand leg 42 extending downwardly through a slide aperture in the right-hand embossment of ear 34. These keeper legs 38 and 42 thus mount the keeper for vertical movement between upper and lower extended and retracted positions. The short leg 42 of the keeper carries a plastic button 44 that electrically isolates an indicator switch arrangement 45, whose function will be described later, from the keeper which is electrically grounded to the vehicle body through the housing 26.

The plunger 36 is formed of planar metallic stock and its upper portion below the upper portion of keeper 18 also extends rearwardly to above the central opening defined by the U-shaped embossed ear 34 on the mounting plate 28 of housing 26. An upper leg portion 46 of the plunger extends downwardly through this opening and merges with a lower leg portion 48 that is slidably received by an apertured ear 50 on plate 28 as best seen in FIG. 7. The plunger is thus vertically movable between raised and depressed positions. A helical spring 52 encircles the lower leg portion 48 of plunger 36 and seats against ear 50 and the lower end of upper leg portion 46 to bias the plunger 36 upwardly to its raised position so that a contact 54 on its upper end, see FIGS. 2 and 11, engages the U-shaped upper portion of the keeper to limit this upward movement of the plunger. This contact is electrically insulated from the plunger 36 by an insulator 56 as seen in FIG. 11. The plunger 36 also carries an actuating portion 58 slidably received within a slot 59 in the housing plate 26 so as to initiate operation of the mechanism in a manner to be described.

Figure 4:
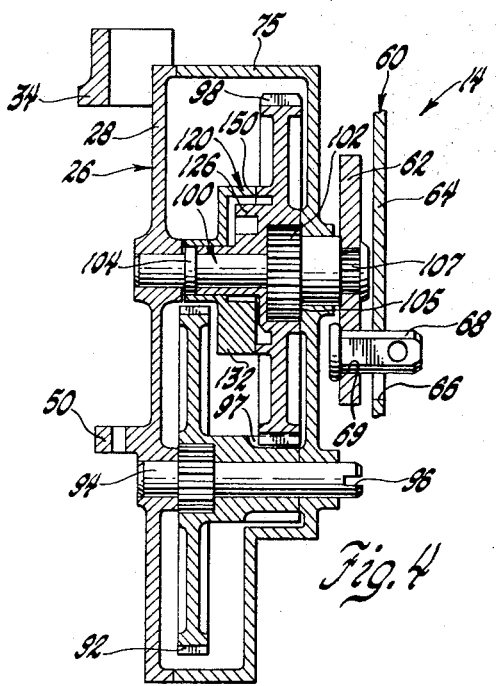

Referring additionally to FIGS. 3 and 4, a linkage 60 includes an ear-shaped first link 62 at the output of a reduction gear drive train and an elongated second link 64 whose lower end defines an elongated slot 66 receiving the flattened shank of a headed pin 68. The headed end of this pin 68 is rotatably received within an aperture 69, FIG. 4, in link 62. The upper end of the link 64 includes an attachment flange 70, see FIG. 2, that attaches to the base portion of the U-shaped portion of keeper 18. Aperture 66 in link 62 is eccentric with respect to the axis of rotation of this link as it is rotated during operation of pull-down mechanism 14 so that pin 68 moves in a circular path and bodily shifts link 64 vertically to thereby vertically reciprocate the keeper 18 between its extended and retracted positions with respect to the housing 26. A helical spring 72, FIGS. 2 and 3, extends between the attachment flange 70 and the pin 68 so as to bias link 64 downwardly and engage the upper end of slot 66 with pin 68. Extension of spring 72 allows link 64 to move upwardly so that pin 68 moves downwardly relative to slot 66. This sliding of the pin and slot connection of linkage 60 allows the link 62 to rotate through a full 360° rotation even when downward keeper movement all the way to its lower or retracted position is prevented.

Figure 6:
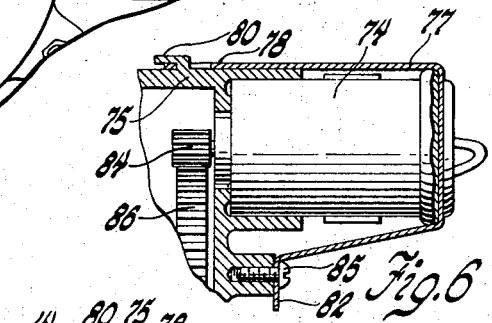
FIGS. 4 through 6 are sectional views of the pull-down mechanism taken respectively along lines 4—4, 5—5, and 6—6 of FIG. 3.

The hold-down mechanism 14 is operated by a unidirectional electric motor 74 that is mounted on a gear casing 75 of housing 26. The gear casing 75 is secured to mounting plate 28 of the housing by nut and bolt arrangements 76 as seen in FIG. 3. The motor 74 is mounted on casing 75 by a strap 77 seen best in FIGS. 2 and 6. This strap includes an apertured end 78 receiving an integral hook-shaped mounting lug 80 on the housing casing. The strap passes over the end of the motor in a somewhat unsymmetrical U-shaped configuration and has a second end with an apertured flange 82 receiving a mounting bolt 85 that attaches this end of the strap to the housing casing 75. The strap 77 thus attaches the motor to the housing in a manner that will allow quick and easy demounting of the motor for repair or replacement. As seen in FIG. 3, the flange 82 of the strap also supports an electrical connector 83 of the circuit for energizing motor 74.

Figure 5:
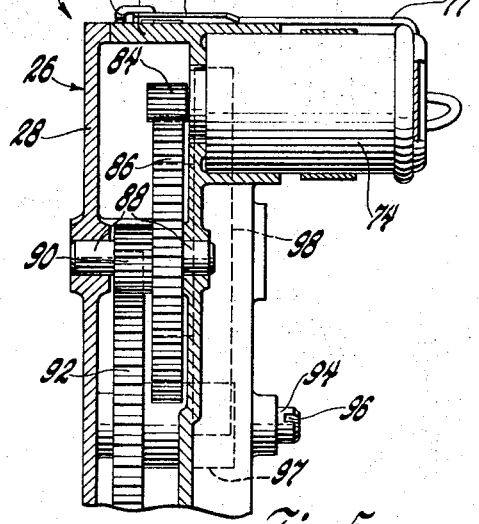

The motor 74 drives a pinion gear 84 which, as seen in FIG. 5, drives a gear 86 at the input of the reduction gear drive train of the mechanism. This gear 86 is rotatably supported in the housing 26 by a pin 88 and carries a pinion gear 90 for driving a gear 92, see this gear engagement in FIG. 9. Gear 92 is supported on the housing by a pin 94, see FIG. 4, whose forward end defines a screwdriver slot 96 that allows manual driving of the gear train in case of motor failure. Just rearward of this screw driver slot or to the left as in FIG. 4, the gear 92 carries a pinion gear 97 that drives an output gear 98.

This output gear 98 is rotatably mounted on the housing by a shaft 100 that is fixed to the gear by splines 102. The rearward end of this shaft 100 includes an annular flange 104 that engages the housing to prevent rearward axial movement of the shaft. Just forward of the splines 102, the shaft 100 has a reduced diameter so as to provide an annular face 105, FIG. 4, for engaging the housing to prevent forward axial movement of the shaft. The forward end of shaft 100 receives a headed pin 107 that is splined to both the shaft and the link 62 of linkage 60. Therefore, upon operation of motor 74, the reduction drive train provided by these gears rotates link 60 so that the linkage 60 reciprocates keeper 18 between extended and retracted positions in the manner previously described.

The operation of pull-down mechanism 14 will now be described starting from a condition in which the compartment panel 12 is in its open position and keeper 18 is positioned in its upper or extended position with respect to the mechanism, which of course means that pin 68 is located at its upper extreme of circular movement so that link 64 is bodily shifted upwardly to locate the keeper in this position. When the compartment panel is moved downwardly to closed position, the bolt 22 of bolt assembly 20 engages the right-hand leg of the U-shaped configuration of keeper 18, as in FIG. 3, or the left-hand leg when viewed as in FIG. 7, and this engagement causes the bolt to move to its latched position about the keeper and thus interlock the keeper and the panel.

The bolt assembly 20 also engages the contact 54 carried by the upper end of plunger 36 as the bolt latching occurs so as to ground a lead 106 of a circuit for energizing the drive motor 74, see FIG. 12. As the bolt assembly engages this contact, the plunger 36 is partially depressed against the bias of its helical spring 52. This partial depression of plunger 36 slides the actuating portion 58 of the plunger downwardly within its housing slot 59 from the position shown in FIG. 9 into engagement with a surface 108 of a switch control member 110 as shown in FIG. 10. This switch control member is pivoted to the housing 26 by a pin 111 and is biased in a clockwise direction by a torsion spring 112 whose ends respectively engage the housing and the switch control member. The sliding engagement of the plunger actuating portion 58 with the switch control member thus moves this control member counterclockwise against its spring bias, and this movement causes a lobe 113 of the switch control member to move a leaf contact 114 of a switch 115 into engagement with a blade contact 116 of the switch. The switch 115 is inserted into gear casing 75 of the housing through an opening 117 seen in FIG. 9. A screw 118, whose shank is seen in FIG. 9, secures the switch within the casing 75. This contact engagement of switch 115 completes an energizing circuit for motor 74, see FIG. 12, and causes the motor to drive the reduction gear drive train so that link 62 is rotated clockwise when viewed in the direction FIG. 3 is taken. This link rotation thus begins to move the pin 68 downwardly toward its FIG. 3 position so that link 64 pulls keeper 18 and panel 12 downward. The engagement of keeper 18 with the upper end of plunger 36 depresses the plunger as the keeper and panel move downward.

With reference to FIGS. 4 and 9, a cam 120 is rotatable on the shaft 100 which carries the output gear 98 of the gear drive train. This cam defines an arcuate slot 122, FIG. 9, with end walls 124. As the keeper is being driven downwardly to its retracted position to seal the panel 12, a driving projection 126 of output gear 98 engages the clockwise wall of this slot and rotates the cam 120 clockwise in a lost motion manner. An integral nub 128 of switch control member 110 moves over the counterclockwise end of an arcuate slot 130 in the outer periphery of cam 120 before the depression or downward movement of plunger 36 slides the plunger actuating portion 58 below the lower end of surface 108 on switch control member 110. It should be noted that nub 128 is laterally spaced with respect to surface 108 so there is no interference between the plunger actuating portion 58 and this nub. Nub 128 then engages an outer surface 132 of cam 120 to maintain switch control member 110 actuated and thereby maintains switch 115 closed as the keeper 18 and panel 12 are driven downward. As the keeper reaches its retracted position and fully compresses the seal between the compartment panel 12 and the compartment opening, the nub 128 of switch control member 110 registers with the clockwise end of an arcuate slot 134 in the cam periphery and allows spring 112 to return this control member to its FIG. 9 unactuated position and thereby open switch 115 to de-energize motor 74.

Just prior to the pull-down mechanism reaching its keeper retracted position, a lobe or stop surface 136 on link 62, see FIG. 3, moves into engagement with a cooperable stop surface flange 138 of a lever 140 that is pivoted to housing 26 by a pin 142. This engagement causes the lever to rotate partially toward the phantom line indicated position of the lever shown in FIG. 3 before the surface 136 moves behind flange 138 as the lever snaps back to its solid line position shown in engagement with a stop 144 under the bias of torsion spring 146 whose central portion encircles pin 142. Therefore, any impetus thereafter tending to cause reverse movement of the gear drive train so as to move the keeper back toward its original position and affect a partial opening of the panel 12 is prevented by engagement of stop surface 136 with flange 138. Also, due to the lost motion connection between driving projection 126 of output gear 98 and the cam 120, FIG. 9, the slight reverse movement of the gear drive train that is possible before stop surface 136 engages flange 138 will not cause cam 120 to rotate in a reverse direction and reactuate switch control member 110 so as to reactuate switch 115. Thus if the compartment panel 12 is pulled down on any compressible object that tends to move the panel slightly back toward open position, such as a suitcase, the mechanism is not reactuated to again drive the keeper to its fully retracted position. This prevents what could be an endless cycling of the keeper to and slightly back from retracted position under such a condition.

With the compartment panel 12 in closed position, opening panel movement may be achieved by either key undetenting of the bolt assembly 20 or by actuation of a switch 148, see FIG. 12, located within the occupant compartment of vehicle body 10, such as in the glove box. If the key mode of undetenting bolt assembly 20 is chosen, the compartment panel 12 will be moved by its conventional counterbalance upwardly as bolt 22 disengages the keeper 18. This upward movement of the bolt assembly allows plunger 36 to move upwardly under the bias of its spring 52, FIG. 7, and the contact 54 carried by the upper end of the plunger will thus ground against the keeper 18. The actuating portion 58 of the plunger slides into engagement with the lower end of surface 108 on switch control member 110 and will move this control member to its actuated position so as to close switch 115. The upward plunger movement is limited by the engagement of contact 54 on its upper end with keeper 18 so as to prevent the actuating portion 58 from sliding upwardly over the upper end of surface 108 and only momentarily actuating switch control member 110. The motor 74 is thus energized by this switch closing and initiates driving of the keeper 18 toward its extended position. The cam 120 rotates clockwise, as in FIG. 9, while the keeper is driven upward so that nub 128 of switch control member 110 moves over the counterclockwise end of arcuate slot 134 into engagement with an outer surface 150 of the cam. This engagement maintains switch 115 closed until the keeper reaches its extended position whereupon the nub 128 registers with the clockwise end of slot 130 of the cam to allow opening of switch 115 as spring 112 moves control member 110 to its unactuated position. The pull-down mechanism is then ready for another closing movement of the panel 12.

When the compartment panel 12 is closed and the occupant compartment switch 148 is actuated to complete the motor energizing circuit, the initial driving actuation of the mechanism to move the keeper toward extended position is thus provided without the previously described action of actuating portion 58 of plunger 36. As this driving movement proceeds and the switch control member 110 is actuated by movement of the nub 128 onto the outer surface 150 of cam 120, the switch 148 may then be opened and the driving movement of the keeper 18 toward extended position will continue without any further deliberate effort on an occupant's part. As this movement proceeds with the compartment panel 12 still latched to the keeper 18, an undetenting nose or surface 152 of the link 62, see FIG. 3, moves into engagement with an undetenting flange 154 of lever 140. An undetenting rod or member 156 has its lower end pivotally secured to an arm 158 of the lever by a suitable clip 159 and moves upwardly as this engagement occurs so as to slide through a suitable aperture in a flange 160 of housing 26. Before the undetenting surface 152 passes behind flange 154, the upward movement of undetenting member 156 is sufficient to move the upper end of this member into engagement with the bolt assembly 20 and to thereby provide an undetenting action of bolt 22. The structure of bolt assembly 20 providing this bolt undetenting may be merely a surface on the bolt detent that is engaged by the upper end of undetenting member 150 or may include an intermediate lever that is engaged by this upper end of the undetenting member 156 so as to be thereby actuated to undetent the bolt. After the bolt undetenting, the compartment lid 12 moves upwardly free of keeper 18. The operation of the pull-down mechanism will thereafter cease as the nub 128 registers with the clockwise end of slot 130 and deactuates switch 115 in the manner previously described.

It should be apparent that when the keeper is in extended position, manual depression of plunger 36 will not initiate operation of the pull-down mechanism since the contact 54 will then not be grounded so as to complete an energizing circuit to motor 74. Also, with reference to the indicator arrangement 45 shown in FIG. 7, a spring 160 this arrangement will move a contact carrying member 162 upwardly within a bracket 164 when the keeper 18 is in its extended position. This movement grounds a contact 166 to the housing at the lower side of bracket 164 and supplies a signal to a suitable circuit that energizes an audio and/or visual indicator to apprise a vehicle occupant of such a condition. Upon movement of the keeper to retracted position, its shorter leg 42 depresses member 162 against the bias of spring 160 and thereby isolates contact 166 from ground to de-energize the indicator.

It is believed evident from the foregoing description that this invention provides an improved pull-down mechanism for a vehicle body compartment panel.

What is claimed is:

1. In a vehicle body including a compartment panel movable between open and closed positions, a pull-down mechanism for the panel comprising:

a bolt assembly mounted on the panel and having a bolt that is spring biased to an unlatched position and a key releasable detent for holding the bolt in a latched position upon movement thereto;

a housing mounted on the vehicle body and including a bolt keeper that is vertically reciprocal relative to the housing between an extended position where the keeper engages the bolt during closing of the panel so as to move the bolt to latched position and thereby interconnect the keeper and the panel in a partially closed position and a retracted position where the keeper positions the interconnected panel in the closed position;

drive means supported by the housing and including a reduction gear drive train, a unidirectional electric motor for driving the input of the drive train, and a linkage connected to the output of the drive train and to the keeper so as to reciprocate the keeper between the extended and retracted positions;

a control member normally biased to an unactuated position and movable to an actuated position to complete an electric circuit energizing the motor;

a plunger mounted on the housing for vertically reciprocal movement adjacent the keeper between raised and depressed positions, means biasing the plunger to the raised position, an upper portion on the plunger which is engaged by the bolt assembly during latching thereof to the keeper so as to partially depress the plunger, an actuating portion on the plunger that moves into engagement with the control member during this partial depression and moves the control member to its actuated position so that the motor is energized to drive the keeper toward retracted position and the interconnected panel toward closed position, the plunger moving to its depressed position by engagement thereof with the bolt assembly as the panel is driven to its closed position, and the actuating portion of the plunger moving out of engagement with the control member prior to the panel reaching closed position;

a cam rotatable with the output of the drive train and including first and second surfaces for engaging the control member, the first surface maintaining the control member in actuated position after the depression of the plunger moves the actuating portion of the plunger out of engagement with the control member and this surface allowing the control member to move under its bias to unactuated position as the panel reaches closed position so that the motor is de-energized with the panel in this position, the second surface maintaining the control member in actuated position after upward plunger movement initiates driving movement of the keeper toward its extended position subsequent to key undetenting of the bolt with the panel closed and this surface allowing the control member to move under its bias to unactuated position as the keeper reaches extended position; and engageable surfaces on the plunger and the keeper that limit the movement of the plunger toward raised position upon the key undetenting of the bolt so that the actuating portion of the plunger initially maintains the control member in actuated position so as to initiate the driving of the keeper to extended position.

2. In a vehicle body including a compartment panel movable between open and closed positions, a pull-down mechanism for the panel comprising:

a bolt assembly mounted on the panel and having a bolt that is spring biased to an unlatched position and a key releasable detent for holding the bolt in a latched position upon movement thereto;

a housing mounted on the vehicle body and including a bolt keeper mounted on the housing for vertically reciprocal movement between an extended position where the keeper engages the bolt during closing of the panel so as to move the bolt to latched position and thereby interconnect the keeper and the panel in a partially closed position and a retracted position where the keeper positions the interconnected panel in the closed position;

drive means supported by the housing and including a reduction gear drive train, a unidirectional electric motor for driving the input of the drive train, and a linkage including a first link rotatable with the output of the drive train and a second link eccentrically connected to the first link and connected to the keeper so as to reciprocate the keeper between the extended and retracted positions with respect to the housing, the first link including a stop surface;

a stop member mounted on the housing and cooperable with the stop surface of the first link to limit reverse movement of the drive train when an opening force is applied to the closed panel;

a control member normally biased to an unactuated position and movable to an actuated position to complete an electric circuit energizing the motor;

a plunger mounted on the housing for vertically reciprocal movement adjacent the keeper between raised and depressed positions, means biasing the plunger to the raised position, an upper portion on the plunger which is engaged by the bolt assembly during latching thereof to the keeper so as to partially depress the plunger, an actuating portion on the plunger that moves into engagement with the control member during this partial depression and moves the control member to its actuated position so that the motor is energized to drive the keeper toward retracted position and the interconnected panel toward closed position, the plunger moving to its depressed position by engagement thereof with the bolt assembly as the panel is driven to its closed position, and the actuating portion of the plunger moving out of engagement with the control member prior to the panel reaching closed position;

a cam including first and second surfaces for engaging the control member, lost motion means rotatably driving the cam with the output of the gear drive train, the first surface of the cam maintaining the control member in actuated position after the depression of the plunger moves the actuating portion of the plunger out of engagement with the control member and this surface allowing the control member to move under its bias to unactuated position as the panel reaches closed position so that the motor is de-energized with the panel in this position, the lost motion means preventing reverse cam rotation and consequent actuation of the control member when an opening force is applied to the closed panel and causes a slight reverse movement of the drive train prior to the cooperable action of the stop member and the stop surface on the first link, and the second surface maintaining the control member in actuated position after upward plunger movement initiates driving movement of the keeper toward its extended position subsequent to key undetenting of the bolt with the panel closed and this surface allowing the control member to move under its bias to unactuated position as the keeper reaches extended position; and engageable surfaces on the plunger and the keeper that limit the movement of the plunger toward raised position upon the key undetenting of the bolt so that the actuating portion of the plunger initially maintains the control member in actuated position so as to initiate the driving of the keeper to extended position.

3. In a vehicle body including a compartment panel movable between open and closed positions, a pull-down mechanism for the panel comprising:

a bolt assembly mounted on the panel and having a bolt that is spring biased to an unlatched position and a releasable detent for holding the bolt in a latched position upon movement thereto, the detent being released by either key action or secondary undetenting action;

a housing mounted on the vehicle body and including a bolt keeper that is mounted on the housing for vertically reciprocal movement between an extended position where the keeper engages the bolt during closing of the panel so as to move the bolt to latched position and thereby interconnect the keeper and the panel in a partially closed position and a retracted position where the keeper positions the interconnected panel in closed position;

drive means supported by the housing and including a reduction gear drive train, a unidirectional electric motor for driving the input of the drive train, and a linkage including a first link rotatable with the output of the drive train and a second link eccentrically connected to the first link and connected to the keeper so as to reciprocate the keeper between extended and retracted positions with respect to the housing, the first link including a stop surface and an undetenting surface and these surfaces being circumferentially spaced with respect to each other about the axis of rotation of the first link;

a control member normally biased to an unactuated position and movable to an actuated position to complete an electric circuit energizing the motor;

a plunger mounted on the housing for vertically reciprocal movement adjacent the keeper between raised and depressed positions, means biasing the plunger to the raised position, an upper portion on the plunger which is engaged by the bolt assembly during latching thereof to the keeper so as to partially depress the plunger, an actuating portion on the plunger that moves into engagement with the control member during this partial depression and moves the control member to its actuated position so that the motor is energized to drive the keeper toward retracted position and the interconnected panel toward closed position, the plunger moving to its depressed position by engagement thereof with the bolt assembly as the panel is driven to its closed position, and the actuating portion of the plunger moving out of engagement with the control member prior to the panel reaching closed position;

a cam rotatable with the output of the drive train and including first and second surfaces for engaging the control member, the first surface maintaining the control member in actuated position after the depression of the plunger moves the actuating portion of the plunger out of engagement with the control member and this surface allowing the control member to move under its bias to unactuated position as the panel reaches closed position so that the motor is de-energized with the panel in this position, the second surface maintaining the control member in actuated position after upward plunger movement initiates driving movement of the keeper toward its extended position subsequent to key undetenting of the bolt with the panel closed and this surface allowing the control member to move under its bias to unactuated position as the keeper reaches extended position;

engageable surfaces on the plunger and the keeper that limit the movement of the plunger toward raised position upon the key undetenting of the bolt so that the actuating portion of the plunger moves the control member to actuated position to initiate the driving of the keeper to extended position; and a secondary undetenting and stop arrangement including a lever pivoted to the housing, a spring biasing the lever to an unactuated position, and an undetenting member that is retractable and extendable relative to the housing as the lever moves against its spring bias, the lever being engaged by the undetenting surface of the first link during driving of the keeper toward extended position subsequent to actuation of an occupant compartment switch in parallel with the circuitry of the control member and this engagement moving the lever to an actuated position where the extended undetenting member engages the latched bolt assembly to undetent the bolt, and the lever being engaged by the stop surface of the first link during movement of the keeper to retracted position so that the stop surface moves the lever partially toward its actuated position and then moves behind the lever to thereafter limit reverse movement of the keeper toward extended position when an opening force applied to the panel tends to reverse the drive train movement.

4. In a vehicle body including a compartment panel movable between open and closed positions, a pull-down mechanism for the panel comprising:

an electrically grounded metallic bolt assembly mounted on the panel and having a bolt that is spring biased to an unlatched position and a key releasable detent for holding the bolt in a latched position upon movement thereto;

a housing mounted on the vehicle body and including a bolt keeper that is mounted on the housing for vertically reciprocal movement between an extended position where the keeper engages the bolt during closing of the panel so as to move the bolt to latched position and thereby interconnect the keeper and the panel in a partially closed position and a retracted position where the keeper positions the interconnected panel in the closed position;

drive means supported by the housing and including a reduction gear drive train, a unidirectional electric motor for driving the input of the drive train, and a linkage connected to the output of the drive train and to the keeper so as to reciprocate the keeper between extended and retracted positions with respect to the housing;

a control member normally biased to an unactuated position and movable to an actuated position to complete a first portion of an electric circuit for energizing the motor;

a plunger mounted on the housing for vertically reciprocal movement adjacent the keeper between raised and depressed positions, means biasing the plunger to the raised position, an upper portion on the plunger which includes a metallic contact that is electrically engaged by the bolt assembly during latching thereof to the keeper so as to complete a second portion of the electric circuit for energizing the motor and to also partially depress the plunger, an actuating portion on the plunger that moves into engagement with the control member during this partial depression and moves the control member to its actuated position so that the first and second circuit portions complete the circuit and energize the motor to drive the keeper toward retracted position and the interconnected panel toward closed position, the plunger moving to its depressed position by engagement of the contact on the upper portion thereof with the bolt assembly as the panel is driven to its closed position, and the actuating portion of the plunger moving out of engagement with the control member prior to the panel reaching closed position;

a cam rotatable with the output of the drive train and including first and second surfaces for engaging the control member, the first surface maintaining the control member in actuated position after the depression of the plunger moves the actuating portion of the plunger out of engagement with the control member and this surface allowing the control member to move under its bias to unactuated position as the panel reaches closed position so that the motor is de-energized with the panel in this position, the second surface maintaining the control member in actuated position after upward plunger movement initiates driving movement of the keeper toward its extended position subsequent to key undetenting of the bolt with the panel closed and this surface allowing the control member to move under its bias to unactuated position as the keeper reaches extended position; and a grounded contact surface on the keeper that electrically engages the contact on the plunger upon upward plunger movement subsequent to key undetenting of the bolt so as to complete the second portion of the circuit for energizing the motor, this engagement limiting the upward movement of the plunger so that the actuating portion of the plunger initially maintains the control member in its actuated position to also complete the first portion of the circuit and to thereby initiate the driving of the keeper to extended position, and the plunger contact being electrically isolated during manual depression of the plunger to prevent manual energization of the mechanism.

5. In a vehicle body including a compartment panel movable between open and closed positions, a pull-down mechanism for the panel comprising:

a bolt assembly mounted on the panel and having a bolt that is spring biased to an unlatched position and a key releasable detent for holding the bolt in a latched position upon movement thereto;

a housing mounted on the vehicle body and including a bolt keeper mounted on the housing for vertically reciprocal movement between an extended position where the keeper engages the bolt during closing of the panel so as to move the bolt to latched position and thereby interconnect the keeper and the panel in a partially closed position and a retracted position where the keeper positions the interconnected panel in the closed position;

drive means supported by the housing and including a reduction gear drive train, a unidirectional electric motor for driving the input of the drive train, a linkage including a first link rotatable with the output of the drive train, a second link connected to the keeper, and a spring biased pin and slot means connecting the first link and the second link at an eccentric location with respect to the axis of rotation of the first link so that the linkage reciprocates the keeper between the extended and retracted positions with respect to the housing as the first link is rotated and allows a limited movement of the keeper toward extended position when the linkage positions the keeper in retracted position, this limited movement occurring due to movement between the links at the pin and slot means against its spring bias;

a control member normally biased to an unactuated position and movable to an actuated position to complete an electric circuit energizing the motor;

a plunger mounted on the housing for vertically reciprocal movement adjacent the keeper between raised and depressed positions, means biasing the plunger to the raised position, an upper portion on the plunger which is engaged by the bolt assembly during latching thereof to the keeper so as to partially depress the plunger, an actuating portion on the plunger that moves into engagement with the control member during this partial depression and moves the control member to its actuated position so that the motor is energized to drive the keeper toward retracted position and the interconnected panel toward closed position, the plunger moving to its depressed position by engagement thereof with the bolt assembly as the panel is driven to its closed position, and the actuating portion of the plunger moving out of engagement with the control member prior to the panel reaching closed position;

a cam rotatable with the output of the drive train and including first and second surfaces for engaging the control member, the first surface maintaining the control member in actuated position after the depression of the plunger moves the actuating portion of the plunger out of engagement with the control member and this surface allowing the control member to move under its bias to unactuated position as the panel reaches closed position so that the motor is de-energized with the panel in this position, the second surface maintaining the control member in actuated position after upward plunger movement initiates driving movement of the keeper toward its extended position subsequent to key undetenting of the bolt with the panel closed and this surface allowing the control member to move under its bias to unactuated position as the keeper reaches extended position; and engageable surfaces on the plunger and the keeper that limit the movement of the plunger toward raised position upon the key undetenting of the bolt so that the actuating portion of the plunger initially maintains the control member in actuated position so as to initiate the driving of the keeper to extended position.

* * * * *